United States Patent [19]

Rek

[11] 4,350,715

[45] Sep. 21, 1982

[54] PLASTIC FAT BASED MATERIAL AND PRODUCTS THEREFROM

[75] Inventor: Johannes H. M. Rek, Vlaardingen, Netherlands

[73] Assignee: Internationale Octrooi Maatschappij "Octropa" B.V., Rotterdam, Netherlands

[21] Appl. No.: 224,824

[22] Filed: Jan. 13, 1981

[30] Foreign Application Priority Data

Jan. 16, 1980 [NL] Netherlands ..................... 8000258

[51] Int. Cl.³ .................... A23D 3/00; A23D 5/00; A23C 13/12
[52] U.S. Cl. ................... 426/570; 426/572; 426/601; 426/603; 426/660
[58] Field of Search ............. 426/570, 581, 585, 586, 426/601, 603, 606, 607, 663, 572, 660

[56] References Cited

U.S. PATENT DOCUMENTS

| | | | |
|---|---|---|---|
| 2,197,457 | 4/1940 | Werk et al. | 426/603 |
| 2,357,896 | 9/1944 | Howe | 426/663 X |
| 2,625,478 | 1/1953 | Mattil et al. | 426/608 |
| 3,210,198 | 10/1965 | Keller | 426/570 X |
| 3,495,990 | 2/1970 | Kayser | 426/570 |
| 3,505,077 | 4/1970 | Bratland | 426/570 |
| 3,716,378 | 2/1973 | Bratland | 426/603 X |
| 4,112,132 | 9/1978 | Badertscher et al. | 426/603 |

FOREIGN PATENT DOCUMENTS

| | | |
|---|---|---|
| 2319300 | 2/1977 | France . |
| 1017091 | 1/1966 | United Kingdom . |
| 1066703 | 4/1967 | United Kingdom . |
| 1140937 | 1/1969 | United Kingdom . |
| 1217395 | 12/1970 | United Kingdom . |
| 1525315 | 9/1978 | United Kingdom . |
| 2003912A | 9/1978 | United Kingdom . |
| 2021140A | 4/1979 | United Kingdom . |

OTHER PUBLICATIONS

Hartnett, D. I., "Cake Shortenings", J.A.O.C.S., Dec. vol. 54, 1977, pp. 557–560.
Dairy Science Abstracts, vol. 36, No. 5, 1974, p. 256.
Knightbridge, P. "Milkfat Blends in Bakery Products", 20th Intl. Dairy Congr. Paris, 1978, pp. 986–987.
Lachmann, A., et al. "Structure and Behavior Of Icings", Bakers Digest, Apr. 1969, pp. 40, 41, 44, 45.

*Primary Examiner*—Robert A. Yoncoskie
*Attorney, Agent, or Firm*—Cushman, Darby & Cushman

[57] ABSTRACT

The addition of palm kernel fat or shea stearin to a plastic fat-based material containing butter fat improves its whipping and creaming properties compared to butter. In particular the creaming time to achieve a desired specific volume can be decreased. The material can be either a melange or a margarine.

11 Claims, No Drawings

PLASTIC FAT BASED MATERIAL AND PRODUCTS THEREFROM

The present invention relates to a plastic fat-based material which includes butter fat and to products prepared therefrom.

Due to its desirable organoleptic properties butter is used in many bakery products. For certain uses however for example in the preparation of a product requiring whipping or creaming, butter can be less suitable than some other edible fats as the desired specific volume may either not be achieved or only after a relatively long whipping or creaming time. The failure or difficulty to achieve the desired specific volume can constitute a serious drawback in the preparation of products on an industrial scale.

It is an object of the present invention to provide a plastic fat-based material which includes butter fat, but which has improved whipping and creaming properties relative to butter.

According to the present invention this object can be achieved by a material which further includes at least one fat selected from the group consisting of palm kernel fat and shea stearin and has a solid fats content, based on the total fat present, of at least 15 wt. % at 20° C.

We have surprisingly found that if the fat-based material includes palm kernel fat and/or shea stearin in addition to the butter fat then its creaming and whipping properties can be improved, even though its solid fats content may be as low as 15 wt. %. The solid fat content of butter itself depends on the origin of the butter and seasonal influences and at 20° C. varies from 12 wt. % to a maximum of 17 wt. %. A fat's creaming and whipping properties depend on its solid content and it had been thought that an increase in for example the air uptake and stand-up of butter when used as a creaming fat could only be achieved if the amount of fat present in the solid phase were increased to above that normally found in butter. Although a material having a solids fat content of 15 wt. % can show improved creaming and whipping properties, the preferred minimum fat content present in the solid phase at 20° C. is 18%. For some materials the optimum amount of solid fat present lies in the range of from 20 to 22%.

It has moreover been found that only a limited number of fats are suitable for improving the whipping and creaming properties of butter. Out of a large number of edible fats and oils investigated only palm kernel fat and shea stearin when added to butter fat produced a material whose creaming and whipping properties were significantly improved compared to butter. The peculiar benefits to be derived from the addition of palm kernel fat are particularly surprising. Neither coconut fat nor palm kernel stearin, each of which it is known to use as a substitute for palm kernel fat due to their affinity in fatty acid composition with that of palm kernel fat and their polymorphism with palm kernel fat, were found suitable for improving the creaming properties of butter.

The distinctive beneficial creaming effects which may be conferred on butter fat by palm kernel fat and shea stearin are illustrated in Table I. The table gives the specific volume of a variety of margarines after creaming with sugar for 5, 15 and 30 minutes respectively. The fatty phase of each margarine is given in the left hand column of Table I and was selected to give a fat solids content ($N_{20}\%$) of $20 \pm 2$ wt. % at 20° C. In each case the margarine was prepared with 16 wt. % water in a microvotator and the creaming properties were assessed, after stabilisation for 1 week at 20° C. by mixing the margarine with caster sugar in a 1:1 mixture in a micro Hobart mixer.

TABLE I

| Composition of the fatty phase | $N_{20}$ (%) | Specific volume on creaming at 20° C. (ml/g) | | |
|---|---|---|---|---|
| | | 5 min. | 15 min. | 30 min. |
| Butter fat 100 | 15 | 1.22 | 1.39 | 1.41 |
| Butter fat/palm kernel fat 65/35 | 20 | 1.40 | 1.68 | 1.79 |
| Butter fat/coconut fat hardened to a melting point of 32° C., 80/20 | 20 | 1.22 | 1.28 | 1.33 |
| Butter fat/palm kernel fat stearin 90/10 | 20 | 1.25 | 1.30 | 1.33 |
| Butter fat/wet fractionated palm oil stearin 95/5 | 22 | 1.13 | 1.23 | 1.23 |
| Butter fat/dry fractionated palm oil stearin 90/10 | 21 | 1.10 | 1.28 | 1.28 |
| Butter fat/wet fractionated butter stearin 93/7 | 22 | 1.08 | 1.13 | 1.15 |
| Butter fat/palm mid fraction 85/15 | 19 | — | 1.34 | 1.41 |
| Butter fat/shea stearin 87.5/12.5 | 19 | — | 1.52 | 1.58 |
| Butter fat/lard stearin 95/5 | 21 | — | 1.25 | 1.34 |
| Butter fat/cocoa butter 57.5/42.5 | 21 | — | 1.43 | 1.46 |
| Butter fat/rapeseed oil hardened to a melting point of 70° C. 92.5/7.5 | 19 | — | — | 1.19 |
| Butter fat/palm oil hardened to a melting point of 58° C. 95/5 | 20 | — | — | 1.39 |
| Butter fat/beef tallow stearin 95/5 | 20 | — | — | 1.46 |
| Butter fat/cotton seed oil hardened to a melting point 37° C. 80/20 | 22 | — | — | 1.48 |

The preferred fatty composition for a margarine embodying the present invention and having a fatty phase comprising butter fat and palm kernel fat lies within the range of from 50 to 85 wt. % butter fat and of from 50 to 15% palm kernel fat. More preferably the fatty phase comprises 60 to 70 wt. % butter fat and 40 to 30 wt. % palm kernel fat. The solid fat in a margarine prepared from a blend of butter fat and palm kernel fat is preferably present in the polymorphic $\beta'$ form.

For a margarine embodying the present invention and having a fatty phase composed of butter fat and shea stearin the preferred fat composition comprises about 60 to 90 wt. % butter fat and about 40 to 10% shea stearin. The optimum composition will depend inter alia on the shea stearin employed. Preferably the shea stearin is a fraction having an iodine value of between 35 and 40.

The preparation of margarines embodying the present invention can follow conventional techniques, for example, the techniques described in "Margarine", A. J. C. Andersen and P. N. Williams, 2nd revised edition, Pergaman Press, Chapter 3. The margarine can be prepared starting from a fatty phase alone or from a fatty phase and an aqueous phase, the latter usually constitutes 16 to 20% of the total composition. A votator is preferably used.

In addition to improving the creaming properties of butter fat when incorporated into a margarine (i.e. a water-in-oil emulsion) the present invention has also been found to be applicable to a butter fat present in a plastic material comprising a melange (i.e. an oil-in-water emulsion). We have for example discovered that the creaming properties of a wholly diary-based butter are inferior to those of a product made by the same churning technique, but employing as a starting material a cream which consists of a blend of fresh dairy cream and artificial cream made by homogenising melted palm kernel fat in skimmed milk. A suitable composition for the fatty phase was found to be 70 wt. % butter fat and 30 wt. % palm kernel fat.

It is to be understood that the present invention extends to products for example butter cream and the like prepared from the plastic fat-based material of the present invention.

Unless otherwise stated the compositions and solid content of the fatty phase given in the specification are those in the final plastic material. Where for example a margarine is prepared from an aqueous phase which includes butter fat (eg. soured milk), this additional butter fat is taken into account in assessing the overall fat composition.

Embodiments of the present invention will now be described by way of example only.

EXAMPLE 1

Following the procedure described above three margarines were prepared using as the fatty phase a blend of butter fat and palm kernel fat in the following respective ratios by weight 80:20; 70:30; and 65:35. The creaming properties of these three margarines in terms of specific volumes after 5,10,15 and 30 minutes respectively by creaming in a micro Hobart mixer at 20° C. with caster sugar in a 1:1 mixture are given in Table II. Comparison figures are included in the Table for a margarine made from butter fat alone.

TABLE II

| Composition of fatty phase | | Specific volume (ml/g) | | | |
|---|---|---|---|---|---|
| Butter fat | Palm kernal fat | 5 min | 10 min | 15 min | 30 min |
| 100 | 0 | 1.22 | 1.33 | 1.33 | 1.41 |
| 80 | 20 | 1.42 | 1.49 | 1.51 | 1.60 |
| 70 | 30 | 1.46 | 1.65 | 1.70 | 1.79 |
| 65 | 35 | 1.40 | 1.59 | 1.68 | 1.79 |

EXAMPLE 2

Butter fat and shea stearin, the latter having an iodine value of 38.8, were employed together in a ratio of butter fat:shea stearin of 87.5:12.5 to prepare a margarine as described above. After stabilisation for 1 week at 20° C. the margarine had a solid fat content of 19% wt based on the total weight of fat present. The creaming properties of the margarine are given in Table I above.

EXAMPLE 3

The following margarine was prepared employing as the fatty phase a blend of butter and palm kernel fat, the butter having a solid fat content at 20° C. of 13.9% wt., and as the aqueous phase bacteriologically soured cream.

2,000 g butter was melted at 45° C. in the premix tank of a microvotator unit and 728.2 g palm kernel fat and 196.2 g bacteriologically soured fresh cream (having a fat content of 20%) were added in order to obtain a mixture consisting of 17% of an aqueous phase (including fat free dry matter) and 83% of a fat phase comprising butter fat and palm kernel fat in a ratio of about 70:30. The mixture was crystallised over a micro-votator unit and after 1 week stabilisation at 20° C. the solid content of the fat was found to be 15.9% wt. at 20° C.

The creaming properties of the margarine were assessed by creaming with caster sugar in a 1:1 mixture in a micro-Hobart mixer. After 30 minutes creaming the specific volume of the mixture was found to be 1.76 ml/g.

EXAMPLE 4

The present example illustrates that the whippability of butter prepared by churning can be improved by the addition of palm kernel fat.

A butter was prepared from fresh dairy cream containing 40% wt. fat and using the same procedure, a melange was prepared from a mixture of 70% wt. fresh dairy cream (40% fat) and 30% wt. of an artificial cream comprising 40% wt. palm kernel fat in skimmed milk prepared at 50° C. with an Ultra Turrass stirrer. The average diameter of the fat globules in the artificial cream was 2 μm.

Before churning both creams were held at 10° C. for 14 hours and small amounts of solidified fat which had adhered to the surface of the respective containing vessels were removed. Churning of each cream was then commenced in a Hobart mixer cooled to 10° C. The stirring was initially relatively fast until the first signs of butter or melange separation appeared, but was then slow until all the butter-milk had separated off. The butter or melange grains were then filtered over a cloth and were washed with water in the Hobart mixer under slow stirring. The washed grains were filtered again and kneaded for five minutes to achieve a homogenous mixture.

The products obtained were stored for 1 week at 20° C. and their creaming properties with caster sugar were determined. After 30 minutes creaming a specific volume of 1.32 ml/g was found for the butter prepared from fresh dairy cream and of 1.45 ml/g for the melange formed from the artificial cream containing palm kernel fat.

EXAMPLE 5

The margarine of Example 3 was used to prepare a cake according to the following procedure. A comparison cake was baked from a batter which was produced by the same procedure, but employed butter in place of the margarine.

400 g of the margarine were mixed with 400 g caster sugar and the mixture was creamed in a Hobart mixer until a specific volume of 1.85 ml/g was achieved. 400 g of egg was then added and mixed with the margarine and sugar for 2½ minutes. Finally 400 g flour together with 4 g baking powder and 4 g salt were added and stirring continued for 1 minute. Cakes were then baked from the resulting batter.

A comparison of cakes baked from the margarine-containing batter with those prepared from the butter-containing batter revealed that no significant differences in texture, consistency or taste could be detected.

The following table, Table III, shows however that a time-saving could be achieved in the preparation of the margarine-containing batter compared with the butter-containing batter. Only 3 minutes was required for a specific volume of 1.85 ml/g to be achieved on creaming the margarine-containing batter, compared with 7½ minutes for the butter-containing batter. The smaller differences for the other steps are probably attributable to the presence of the other ingredients and to the relatively high ambient temperature (24° C.) at which the batters were prepared.

TABLE III

| Ingredients present in addition to the margarine or butter | Stirring time (mins) | Specific volume (ml/g) Butter | Specific volume (ml/g) Margarine |
| --- | --- | --- | --- |
| Caster sugar | 2½ | 1.36 | 1.75 |
|  | 3 | — | 1.85 |
|  | 5 | 1.72 | — |
|  | 7½ | 1.85 | — |
| Egg | 2½ | 1.66 | 1.69 |
| Flour etc | 1 | 1.42 | 1.46 |

EXAMPLE 6

The products of each of Examples 1 to 4 were creamed with caster sugar in equal parts by weight. The resulting butter cream (otherwise known as Crème au Beurre) retained its buttery taste and has good stand-up and appearance.

I claim:

1. An edible plastic fat-based composition at least 80 wt % of which comprises a fatty phase consisting of at least 50 wt % butterfat and at least 10 wt % of at least one fat selected from the group consisting of shea stearin and unhardened palm kernel fat, the solid fat content of the fatty phase, based on the total fat present, being at least 15 wt % at 20° C.

2. A composition according to claim 1 wherein the composition is a margarine and the solids fat content is at least 18 wt. %.

3. A margarine according to claim 2, wherein the solids fat content is in the range of from 20 to 22 wt. %.

4. A margarine according to claim 2 or claim 3, wherein the fatty phase comprises 50 to 85% butter fat and 50 to 15% unhardened palm kernel fat and the solid fat present is in the polymorphic $\beta'$ form.

5. A margarine according to claim 4, wherein the fatty phase comprises 60 to 70% butter fat and 40 to 30% unhardened palm kernel fat.

6. A margarine according to claim 2 or claim 3, wherein the fatty phase comprises 60 to 90% butter fat and 40 to 10% shea stearin.

7. A margarine according to claim 6, wherein the fatty phase comprises about 70% butter fat and about 30% shea stearin.

8. A melange according to claim 1, wherein the composition is an oil-in-water emulsion.

9. A melange according to claim 8, wherein the fatty phase comprises about 70% butter fat and about 30% palm kernel fat.

10. A product made by creaming the composition of claim 1.

11. A butter cream according to claim 10 made by creaming the composition with sugar.

* * * * *